(12) United States Patent
Hao et al.

(10) Patent No.: US 8,537,729 B2
(45) Date of Patent: Sep. 17, 2013

(54) METHOD FOR SENDING A SOUNDING REFERENCE SIGNAL OF UPLINK CHANNEL IN A TIME DIVISION DUPLEX SYSTEM

(75) Inventors: Peng Hao, Shenzhen (CN); Chunli Liang, Shenzhen (CN); Bo Dai, Shenzhen (CN); Shuqiang Xia, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 388 days.

(21) Appl. No.: 12/920,958

(22) PCT Filed: Jun. 2, 2009

(86) PCT No.: PCT/CN2009/072100
§ 371 (c)(1),
(2), (4) Date: Sep. 3, 2010

(87) PCT Pub. No.: WO2010/012178
PCT Pub. Date: Feb. 4, 2010

(65) Prior Publication Data
US 2011/0013546 A1    Jan. 20, 2011

(30) Foreign Application Priority Data

Aug. 1, 2008 (CN) .......................... 2008 1 0135392

(51) Int. Cl.
*H04L 5/14* (2006.01)
(52) U.S. Cl.
USPC .......................................... 370/294; 370/431
(58) Field of Classification Search
None
See application file for complete search history.

(56) References Cited

U.S. PATENT DOCUMENTS

| | | | |
|---|---|---|---|
| 8,320,267 B2 * | 11/2012 | Wei et al. | 370/252 |
| 2008/0039098 A1 | 2/2008 | Papasakellariou et al. | |

(Continued)

FOREIGN PATENT DOCUMENTS

| | | |
|---|---|---|
| CN | 101106395 A | 1/2008 |
| CN | 101335969 A | 12/2008 |
| RU | 2320012 C2 | 3/2008 |

OTHER PUBLICATIONS

Considerations for PRACH and SRS in UpPTS May 5-9, 2008.

(Continued)

*Primary Examiner* — Hassan Kizou
*Assistant Examiner* — Roberta A Shand
(74) *Attorney, Agent, or Firm* — Oppedahl Patent Law Firm LLC

(57) ABSTRACT

A method for sending a sounding reference signal (SRS) of uplink channel in a time division duplex system is provided, a terminal calculates the parameters of the resource for sending an SRS in an uplink pilot time slot (UpPTS) according to the configuration information related to the sounding reference signal (SRS) of the uplink channel, the parameters include the frequency domain start position of the resource, and then the SRS is sent over the resource; wherein when the frequency domain start position of the resource is calculated, it is necessary to determine the index of the first sub-carrier in the maximum SRS bandwidth; the terminal determines the index according to the frequency domain position of one PRACH or that of more PRACHs in the uplink pilot time slots, when the PRACH includes the sub-carrier at the lower boundary of the system bandwidth, the upper boundary of the system bandwidth is used as the end position of the maximum SRS bandwidth and the start position of the maximum SRS bandwidth is calculated; and when the PRACH includes the sub-carrier at the upper boundary of the system bandwidth, the lower boundary of the system bandwidth is used as the start position of the maximum SRS bandwidth, and then the index is determined through the start position of the maximum SRS bandwidth plus the offset parameter configured for the terminal. With the sending position of the maximum SRS bandwidth in the UpPTS, which is obtained by the method of the present invention, the interference between the SRS signal and the PARCH can be avoided, and it is possible to implement the channel sounding for more bandwidth.

12 Claims, 5 Drawing Sheets

(56) References Cited

U.S. PATENT DOCUMENTS

2009/0180435 A1*  7/2009  Sarkar .......................... 370/330
2012/0320880 A1* 12/2012  Han et al. .................... 370/335
2012/0327860 A1* 12/2012  Li et al. ....................... 370/328

OTHER PUBLICATIONS

On SRS frequency position definition Jun. 30-Jul. 4, 2008.
Way Forward on the Maximum SRS Bandwidth for UpPTS Jun. 29-Jul. 4, 2008.
Sounding Maximum Bandwidth for UpPTS Jun. 30-Jul. 4, 2008.
Physical channels and modulation May 31, 2008.
International Search Report in international application No. PCT/CN2009/072100, mailed on Sep. 10, 2009.
English Translation of the Written Opinion of the International Search Authority in international application No. PCT/CN2009/072100, mailed on Sep. 10, 2009.
Supplementary European Search Report in European application No. 09802371.6, mailed on Apr. 9, 2013.
Panasonic: "Bandwidth configuration for SRS transmission within UpPTS", 3GPP Draft; R1-082410, vol. RAN WG1, No. Warsaw, Poland Jun. 30, 2008.
Panasonic et al : "Uplink sounding RS bandwidth configuration", 3GPP Draft; R1-082264, vol. RAN WG1, No. Kansas City, USA May 5, 2008.
Catt et al: "SRS bandwidth in UpPTS and TP for 36.211", 3GPP Draft; R1-082563, vol. RAN WG1, No. Warsaw, Poland Jun. 30, 2008.

* cited by examiner

METHOD FOR SENDING A SOUNDING REFERENCE SIGNAL OF UPLINK CHANNEL IN A TIME DIVISION DUPLEX SYSTEM

TECHNICAL FIELD

The present invention relates to a time division duplex (TDD) system, particularly to a method for sending a sounding reference signal (SRS) of uplink channel in a TDD system.

BACKGROUND

A frame structure under a TDD mode in the Long Term Evolution (LTE) system (also called frame structure type 2) is shown in FIG. 1. In this frame structure, a radio frame of a length of 10 ms (307200 Ts, 1 ms=30720 Ts) is divided into two half-frames, the length of each half-frame is 5 ms (153600 Ts), and each half-frame contains 5 subframes of a length of 1 ms each. The role of each subframe is shown in Table 1, wherein D denotes a downlink subframe used to transmit downlink signals; and U denotes an uplink subframe used to transmit uplink signals. Further, an uplink/downlink subframe is divided into two time slots of a length of 0.5 ms each. S denotes a special subframe containing three special time slots which are a Downlink Pilot Time Slot (DwPTS), a Guard Period (GP) and an Uplink Pilot Time Slot (UpPTS). In a practical system, the mobile phones are informed of the indexes of uplink/downlink configuration through broadcast messages.

TABLE 1

| Config- | Switch-point | Subframe number | | | | | | | | | |
|---|---|---|---|---|---|---|---|---|---|---|---|
| uration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The structure of the Physical Random Access Channel (PRACH, also called Random Access Opportunity) in the LTE system is shown in FIG. 2. A preamble consists of a CP and a Sequence. Different preamble formats mean different lengths of CPs and/or Sequences. Currently, the preamble formats supported by the TDD mode in the LTE system are shown in Table 2.

TABLE 2

| Preamble formats | | |
|---|---|---|
| Preamble format | $T_{CP}$ | $T_{SEQ}$ |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (frame structure type 2 only) | $448 \cdot T_s$ | $4096 \cdot T_s$ |

Among the foregoing preamble formats, preamble formats 0-3 are transmitted in the normal uplink subframes, while preamble format 4 is transmitted in the UpPTS.

Preamble format 0 is transmitted in one normal uplink subframe;

Preamble format 1 or 2 is transmitted in two normal uplink subframes;

Preamble format 3 is transmitted in three normal uplink subframes;

Preamble format 4 is transmitted in the UpPTS (the starting position for transmitting is the position which is 5158 Ts before the end of UpPTS).

A Resource Block (RB) is used as a unit in the resource assignment in the LTE system. An RB occupies 12 Resource Elements (REs) in the frequency domain and occupies one time slot in the time domain, i.e. occupies 7 SC-OFDM symbols of normal cyclic prefix (normal CP) or 6 SC-OFDM symbols of extended cyclic prefix (extended CP). If the total number of RBs to which the uplink system bandwidth corresponds in the frequency domain is defined as $N_{RB}^{UL}$, then the indexes of RBs will be $0, 1, \ldots, N_{RB}^{UL}-1$ and the indexes of the sub-carriers (or called REs, namely Resource Elements) will be $0, 1, \ldots, N_{RB}^{UL} \cdot N_{SC}^{RB}-1$. $N_{SC}^{RB}$ is the number of sub-carriers to which a RB corresponds in the frequency domain.

In the frequency domain, a PRACH occupies the bandwidth to which 6 RBs correspond, i.e. 72 REs. The bandwidth of each RE is 15 kHz. The PRACHs with the same time domain positions are differentiated by the frequency domain.

An UpPTS in the TDD system may be used to send an SRS of uplink channel and a PRACH of Preamble format 4.

The method of alternate one-side mapping is adopted in the frequency domain mapping of the PRACH sent in the UpPTS, i.e. mapping from the low frequency band to the high frequency band in certain UpPTS and mapping from the high frequency band to the low frequency band in a neighboring UpPTS. The mapping formula may be expressed in the following form.

$$n_{PRB}^{RA} = \begin{cases} n_{PRB\ offset}^{RA} + 6 f_{RA}, & \text{if } \left( \frac{(n_f \bmod 2) \times}{(2 - N_{SP}) + t_{RA}^1} \right) \bmod 2 = 0 \\ N_{RB}^{UL} - 6 - n_{PRB\ offset}^{RA} - 6 f_{RA}, & \text{otherwise} \end{cases}$$

wherein $n_{PRB}^{RA}$ denotes the index of the first RB of the PRACH; $n_{PRB\ offset}^{RA}$ is the frequency domain starting position of the PRACH; $N_{RB}^{UL}$ is the total number of RBs to which the uplink system bandwidth configuration corresponds; $f_{RA}$ is the frequency domain index of the PRACH with the same time domain position; $n_f$ is the radio frame number, and $N_{SP}$ is the number of the switch-points from downlink to uplink in a radio frame of a length of 10 ms. $t_{RA}^1 = 0, 1$ denote assignment in the first half-frame and the second half-frame of a radio frame respectively. There may be a plurality of PRACHs in an UpPTS. These PRACHs are continuous in the frequency domain.

SRS-Bandwidth configuration is based on a tree structure. Each SRS bandwidth configuration corresponds to a tree structure, the SRS-Bandwidth of the highest level corresponds to the maximum bandwidth of this SRS bandwidth configuration. Tables 3-6 show the SRS bandwidth configurations in different uplink bandwidth ranges. $m_{SRS,b}$ denotes the number of RBs which correspond to the SRS-Bandwidth of the level whose index is b in the tree structure, $N_b$ denotes the number of branch nodes of a node on the level whose index is (b−1), which are located on the level whose index is b in the tree structure, b=0 corresponds to the first level, namely the highest level of the tree structure, and $m_{SRS,0}$ is the maximum SRS-Bandwidth under this configuration. N/A denotes that there are not any corresponding branch nodes on the level.

Taking the SRS bandwidth configuration 1 in Table 3 for example, b=0 is the first level, the SRS-Bandwidth to which this level corresponds is the bandwidth to which 32 RBs correspond, and is the maximum SRS-Bandwidth of this SRS bandwidth configuration; b=1 is the second level, the SRS-Bandwidth of this level is the bandwidth to which 16 RBs correspond, and the SRS-Bandwidth of the first level is divided into two SRS-Bandwidths of the second level; b=2 is the third level, the SRS-Bandwidth of this level is the bandwidth to which 8 RBs correspond, and the SRS-Bandwidth of the second level is divided into two SRS-Bandwidths of the third level; b=3 is the fourth level, the SRS-Bandwidth of this level is the bandwidth to which 4 RBs correspond, and the SRS-Bandwidth of the third level is divided into two SRS-Bandwidths of the fourth level.

Further, the sub-carriers of the SRS in the same SRS frequency band are located in every other sub-carrier. As shown in FIG. 4, this comb structure allows more users to send SRSs in the same SRS-Bandwidth.

TABLE 3

$(6 \leq N_{RB}^{UL} \leq 40)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | N/A | 1 | 4 | 3 |
| 1 | 32 | 1 | 16 | 2 | 8 | 2 | 4 | 2 |
| 2 | 24 | 1 | N/A | 1 | N/A | 1 | 4 | 6 |
| 3 | 20 | 1 | N/A | 1 | N/A | 1 | 4 | 5 |
| 4 | 16 | 1 | N/A | 1 | N/A | 1 | 4 | 4 |
| 5 | 12 | 1 | N/A | 1 | N/A | 1 | 4 | 3 |
| 6 | 8 | 1 | N/A | 1 | N/A | 1 | 4 | 2 |
| 7 | 4 | 1 | N/A | N/A | N/A | N/A | N/A | N/A |

TABLE 4

$(40 < N_{RB}^{UL} \leq 60)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | N/A | 1 | 4 | 5 |
| 3 | 36 | 1 | 12 | 3 | N/A | 1 | 4 | 3 |
| 4 | 32 | 1 | 16 | 2 | 8 | 2 | 4 | 2 |
| 5 | 24 | 1 | N/A | 1 | N/A | 1 | 4 | 6 |
| 6 | 20 | 1 | N/A | 1 | N/A | 1 | 4 | 5 |
| 7 | 16 | 1 | N/A | 1 | N/A | 1 | 4 | 4 |

TABLE 5

$(60 < N_{RB}^{UL} \leq 80)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | N/A | 1 | 4 | 5 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | N/A | 1 | 4 | 5 |
| 6 | 36 | 1 | 12 | 3 | N/A | 1 | 4 | 3 |
| 7 | 32 | 1 | 16 | 2 | 8 | 2 | 4 | 2 |

TABLE 6

$(80 < N_{RB}^{UL} \leq 110)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | N/A | 1 | 4 | 5 |
| 6 | 48 | 1 | 24 | 2 | 12 | 2 | 4 | 3 |
| 7 | 48 | 1 | 16 | 3 | 8 | 2 | 4 | 2 |

In the UpPTS, when the maximum SRS-Bandwidth is used to send an SRS, the maximum SRS-Bandwidth $m_{SRS,0}^{max}$ may also be calculated with the following formula (namely the SRS-Bandwidths to which b=0 corresponds in Tables 3-6 may not be used):

$$m_{SRS,0}^{max} = \max_{\alpha_2,\alpha_3,\alpha_5} [m_{SRS,0} = 2^{1+\alpha_2} \cdot 3^{\alpha_3} \cdot 5^{\alpha_5} \mid m_{SRS,0} \leq (N_{RB}^{UL} - 6 \cdot N_{RA})]$$

wherein $N_{RB}^{UL}$ is the number of RBs to which the uplink system bandwidth corresponds; $N_{RA}$ is the number of PRACHs in the UpPTS; $\alpha_2$, $\alpha_3$ and $\alpha_5$ are non-negative integers. This formula means that the maximum SRS-Bandwidth meeting $m_{SRS,0} \leq (N_{RB}^{UL} - 6 \cdot N_{RA})$ can be obtained through selecting the values of $\alpha_2$, $\alpha_3$ and $\alpha_5$.

When an SRS is sent, the SRS-Bandwidth of each level of the tree structure is within the frequency band range of the maximum SRS-Bandwidth, and the relative position where the SR-bandwidth of each level is located in the maximum SRS-Bandwidth is changeable. Therefore, in order to prevent the SRS from interfering with the PRACH in the UpPTS and implement the channel sounding for more bandwidth, the frequency domain position of the maximum SRS-Bandwidth in the UpPTS should be configured reasonably.

SUMMARY

The technical problem to be solved in the present invention is to provide a method for sending an SRS of uplink channel in a TDD system. With the sending position of the maximum SRS-Bandwidth in the UpPTS, which is obtained by the method, the interference between the SRS signal and the PARCH can be avoided and it is possible to implement the channel sounding for more bandwidth.

To solve the foregoing technical problem, the present invention provides a method for sending an SRS of uplink channel in a TDD system, a terminal calculates the parameters of the resource for sending an SRS in a UpPTS according to the configuration information related to the SRS of the uplink channel, the parameters include a frequency domain starting position of the resource, and then the SRS is sent over the resource; wherein it is necessary to determine an index of the first sub-carrier in the maximum SRS-Bandwidth when the frequency domain starting position of the resource is calculated;

wherein the terminal determines the index according to the frequency domain position of one PRACH or that of more PRACHs in the UpPTS, when the PRACH includes the sub-carrier at the lower boundary of the system bandwidth, the upper boundary of the system bandwidth is used as the end position of the maximum SRS-Bandwidth, thereby the starting position of the maximum SRS-Bandwidth can be calculated; and when the PRACH includes the sub-carrier at the upper boundary of the system bandwidth, the lower boundary of the system bandwidth is used as the starting position of the maximum SRS-Bandwidth, and then the index can be determined through the starting position of the maximum SRS-Bandwidth plus the offset parameter configured for the terminal.

To solve the foregoing technical problem, the present invention also provides a method for sending an SRS of uplink channel in a TDD system, a terminal calculates the parameters of the resource for sending an SRS in a UpPTS according to the configuration information related to the SRS of the uplink channel, the parameters include a frequency domain starting position of the resource, and then the SRS is sent over the resource; wherein it is necessary to determine an index $k_0$ of the first sub-carrier in the maximum SRS-Bandwidth $m_{SRS}$ when the frequency domain starting position of the resource is calculated;

wherein the terminal calculates the index $k_0$ with the following formula:

$$k_0 = \begin{cases} (N_{RB}^{UL} - m_{SRS}) \cdot N_{SC}^{RB} + k_{TC}, & \text{if } \left( \dfrac{(n_f \bmod 2) \times}{(2 - N_{SP}) + t_{RA}^1} \right) \bmod 2 = 0 \\ k_{TC}, & \text{if } \left( \dfrac{(n_f \bmod 2) \times}{(2 - N_{SP}) + t_{RA}^1} \right) \bmod 2 \neq 0 \end{cases}$$

wherein $N_{RB}^{UL}$ is the number of RBs to which the uplink system bandwidth corresponds; $m_{SRS}$ is the number of RBs to which the maximum SRS-Bandwidth corresponds; $N_{SC}^{RB}$ is the number of sub-carriers in the frequency domain, which are contained in an RB; $k_{TC} \in \{0,1\}$ is an offset parameter configured for the terminal; $n_f$ is the system frame number of the radio frame where the UpPTS is located; $N_{SP}$ is the number of the switch-points from downlink to uplink in a radio frame; when the UpPTS is in the first half-frame of the radio frame, $t_{RA}^1 = 0$, and when the UpPTS is in the second half-frame of the radio frame, $t_{RA}^1 = 1$.

To solve the foregoing technical problem, the present invention further provides a method for sending an SRS of uplink channel in a TDD system, a terminal calculates the parameters of the resource for sending an SRS in a UpPTS according to the configuration information related to the SRS of the uplink channel, the parameters include a frequency domain starting position of the resource, and then the SRS is sent over the resource; wherein it is necessary to determine an index of the first sub-carrier in the maximum SRS-Bandwidth when the frequency domain starting position of the resource is calculated;

wherein the terminal determines the index according to the frequency domain position of one PRACH or that of more PRACHs in the UpPTS, first the maximum SRS-Bandwidth is located in the middle of the remaining frequency band which is obtained through subtracting from the uplink system bandwidth the frequency band occupied by the PRACH, thereby the starting position of the maximum SRS-Bandwidth is calculated, and then the index can be determined through the starting position of the maximum SRS-Bandwidth plus the offset parameter configured for the terminal.

To solve the foregoing technical problem, the present invention further provides a method for sending an SRS of uplink channel in a TDD system, a terminal calculates the parameters of the resource for sending an SRS in a UpPTS according to the configuration information related to the SRS of the uplink channel, the parameters include a frequency domain starting position of the resource, and then the SRS is sent over the resource; wherein it is necessary to determine an index $k_0$ of the first sub-carrier in the maximum SRS-Bandwidth $m_{SRS}$ when the frequency domain starting position of the resource is calculated;

wherein the terminal calculates the index $k_0$ with the following formula:

$$k_0 = \begin{cases} \left( \dfrac{\left\lfloor \frac{N_{RB}^{UL}}{2} \right\rfloor - \frac{m_{SRS}}{2} + 3N_{RA}}{} \right) \cdot N_{SC}^{RB} + k_{TC}, & \text{if } \left( \dfrac{(n_f \bmod 2) \times}{(2 - N_{SP}) + t_{RA}^1} \right) \bmod 2 = 0 \\ \left( \dfrac{\left\lfloor \frac{N_{RB}^{UL}}{2} \right\rfloor - \frac{m_{SRS}}{2} - 3N_{RA}}{} \right) \cdot N_{SC}^{RB} + k_{TC}, & \text{if } \left( \dfrac{(n_f \bmod 2) \times}{(2 - N_{SP}) + t_{RA}^1} \right) \bmod 2 \neq 0 \end{cases}$$

wherein $N_{RB}^{UL}$ is the number of RBs to which the uplink system bandwidth corresponds; $m_{SRS}$ is the number of RBs to which the maximum SRS-Bandwidth corresponds; $N_{RA}$ is the number of PRACHs in the UpPTS; $N_{SC}^{RB}$ is the number of sub-carriers in the frequency domain, which are contained in an RB; $k_{TC} \in \{0,1\}$ is an offset parameter configured for the terminal; $n_f$ is the system frame number of the radio frame where the UpPTS is located; $N_{SP}$ is the number of the switch-points from downlink to uplink in a radio frame; when the UpPTS is in the first half-frame of the radio frame, $t_{RA}^1=0$, and when the UpPTS is in the second half-frame of the radio frame, $t_{RA}^1=1$.

To solve the foregoing technical problem, the present invention further provides a method for sending an SRS of uplink channel in a TDD system, a terminal calculates the parameters of the resource for sending an SRS in a UpPTS according to the configuration information related to the SRS of the uplink channel, the parameters include a frequency domain starting position of the resource, and then the SRS is sent over the resource; wherein it is necessary to determine an index of the first sub-carrier in the maximum SRS-Bandwidth when the frequency domain starting position of the resource is calculated;

wherein the terminal determines the index according to the frequency domain position of one PRACH or that of more PRACHs in the UpPTS, when the PRACH includes the sub-carrier at the lower boundary of the system bandwidth, the first sub-carrier following the PRACH is used as the starting position of the maximum SRS-Bandwidth; and when the PRACH includes the sub-carrier at the upper boundary of the system bandwidth, the lower boundary of the system bandwidth is used as the starting position of the maximum SRS-Bandwidth, and then the index can be determined through the starting position of the maximum SRS-Bandwidth plus the offset parameter configured for the terminal.

To solve the foregoing technical problem, the present invention further provides a method for sending an SRS of uplink channel in a TDD system, a terminal calculates the parameters of the resource for sending an SRS in a UpPTS according to the configuration information related to the SRS of the uplink channel, the parameters include a frequency domain starting position of the resource, and then the SRS is sent over the resource; wherein it is necessary to determine an index $k_0$ of the first sub-carrier in the maximum SRS-Bandwidth $m_{SRS}$ when the frequency domain starting position of the resource is calculated;

wherein the terminal calculates the index $k_0$ with the following formula:

$$k_0 = \begin{cases} 6N_{RA} \cdot N_{SC}^{RB} + k_{TC}, & \text{if} \left( \dfrac{(n_f \bmod 2) \times}{(2-N_{SP}) + t_{RA}^1} \right) \bmod 2 = 0 \\ k_{TC} & \text{if} \left( \dfrac{(n_f \bmod 2) \times}{(2-N_{SP}) + t_{RA}^1} \right) \bmod 2 \neq 0 \end{cases}$$

wherein $N_{RA}$ is the number of PRACHs in the UpPTS; $N_{SC}^{RB}$ is the number of sub-carriers in the frequency domain, which are contained in an RB; $k_{TC} \in \{0,1\}$ is an offset parameter configured for the terminal; $n_f$ is the system frame number of the radio frame where the UpPTS is located; $N_{SP}$ is the number of the switch-points from downlink to uplink in a radio frame; when the UpPTS is in the first half-frame of the radio frame, $t_{RA}^1=0$, and when the UpPTS is in the second half-frame of the radio frame, $t_{RA}^1=1$.

Further, among the foregoing sending methods, the terminal may calculate the maximum SRS-Bandwidth $m_{SRS}$ by one of the following three methods:

the first method: the terminal may calculate the maximum SRS-Bandwidth $m_{SRS}$ with the following formula:

$$m_{SRS} = m_{SRS,0}^{max} = \max_{\alpha_2,\alpha_3,\alpha_5} \left[ \begin{array}{l} m_{SRS,0} = 2^{1+\alpha_2} \cdot 3^{\alpha_3} \cdot 5^{\alpha_5} \mid \\ m_{SRS,0} \leq (N_{RB}^{UL} - 6 \cdot N_{RA}) \end{array} \right] \quad (1)$$

wherein $N_{RA}$ may be the number of PRACHs in the UpPTS; $\alpha_2$, $\alpha_3$ and $\alpha_5$ may be non-negative integers; $m_{SRS,0}$ may be the SRS-Bandwidth of the first level, which is recalculated through selecting $\alpha_2$, $\alpha_3$ and $\alpha_5$; $m_{SRS}$ may be the maximum SRS-Bandwidth, which is obtained through selecting $\alpha_2$, $\alpha_3$ and $\alpha_5$ under the condition that $m_{SRS,0} \leq (N_{RB}^{UL} - 6 \cdot N_{RA})$;

the second method: the terminal may calculate the maximum SRS-Bandwidth $m_{SRS}$ with the formula $m_{SRS}=N_{RB}^{UL}-6 \cdot N_{RA}$, wherein $N_{RA}$ may be the number of PRACHs in the UpPTS;

the third method: the terminal may use the SRS-Bandwidth $m_{SRS,0}$ of the first level in the tree structure to which SRS bandwidth configuration corresponds as the maximum SRS-Bandwidth $m_{SRS}$.

Further, the terminal may calculate the maximum SRS-Bandwidth $m_{SRS}$ by the first method or the second method, when the SRS-Bandwidth configured for the terminal is on the first level of the tree structure of SRS bandwidth configuration; and may calculate the maximum SRS-Bandwidth $m_{SRS}$ by the third method, when the SRS-Bandwidth configured for the terminal is not on the first level of the tree structure of SRS bandwidth configuration.

With the sending position of the maximum SRS-Bandwidth in the UpPTS, which is obtained by the method of the present invention, the interference between the SRS signal and the PARCH can be avoided. Further, as the bandwidth used by the SRS has wider distribution in the frequency domain when the PRACH is in different positions, it is possible to implement the channel sounding for more bandwidth.

BRIEF DESCRIPTION OF THE DRAWINGS

The drawings are intended to provide further understanding of the present invention and constitute a part of the application. The illustrative embodiments of the present invention and their descriptions are intended to explain the present invention and not to limit the present invention. Among the drawings:

In FIG. 4 and the subsequent drawings, "" stands for the zone of the sub-carriers used by the terminal in the SRS-Bandwith when $K_{TC}=1$; and "" stands for the zone of the sub-carriers used by the terminal in the SRS-Bandwidth when $k_{TC}=0$.

DETAILED DESCRIPTION

Figure 1:
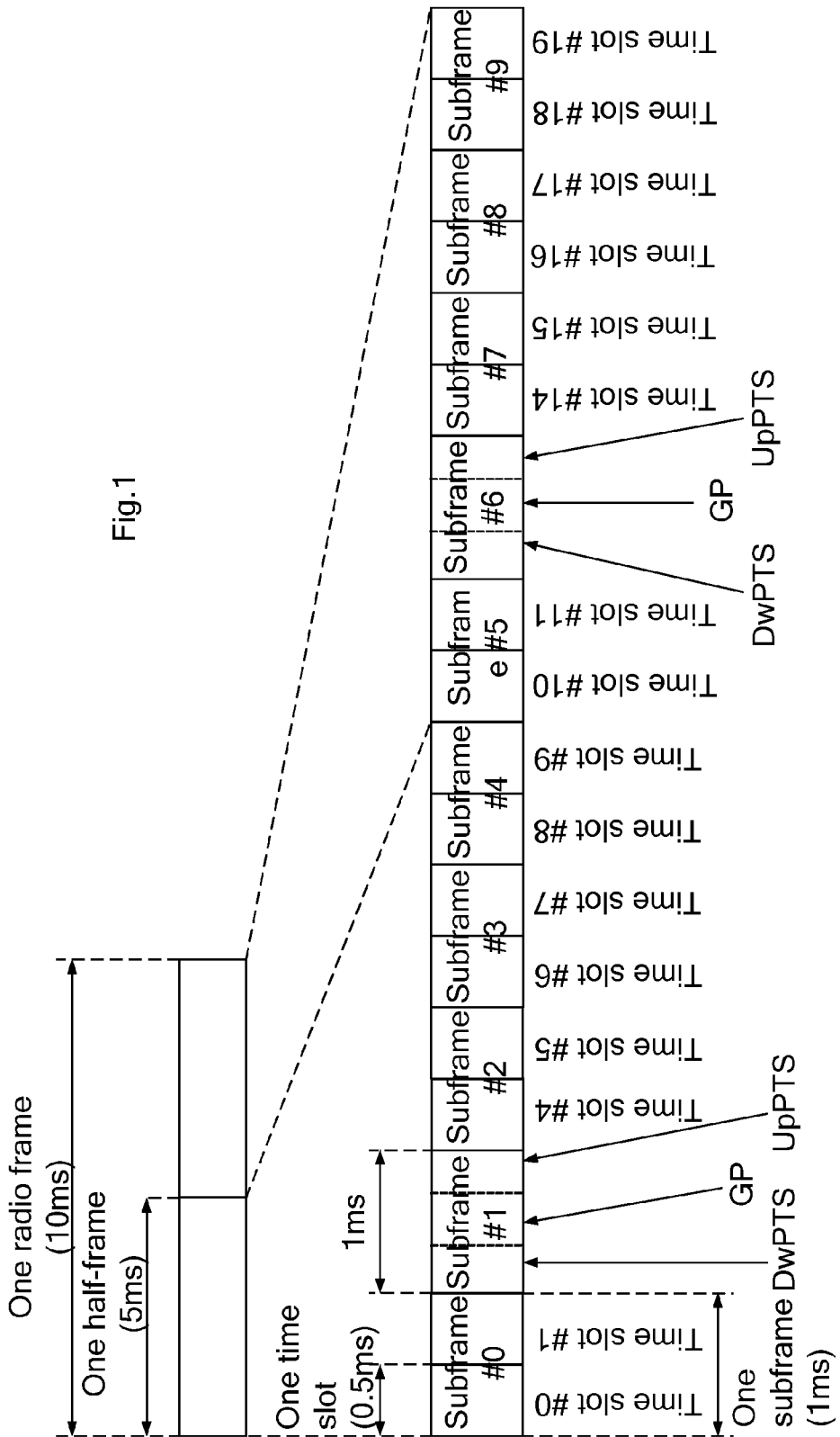
FIG. 1 is a schematic diagram of a frame structure under a TDD mode in the LTE system.
Figure 2:
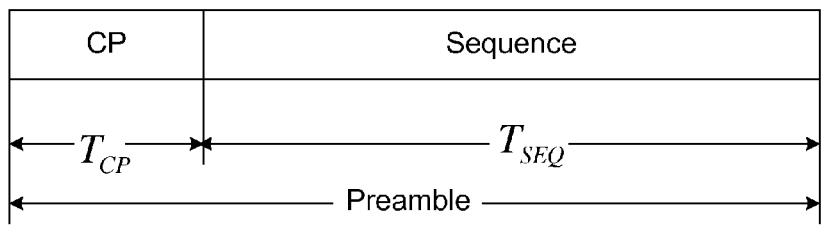
FIG. 2 is a schematic diagram of a PRACH structure.
Figure 3:
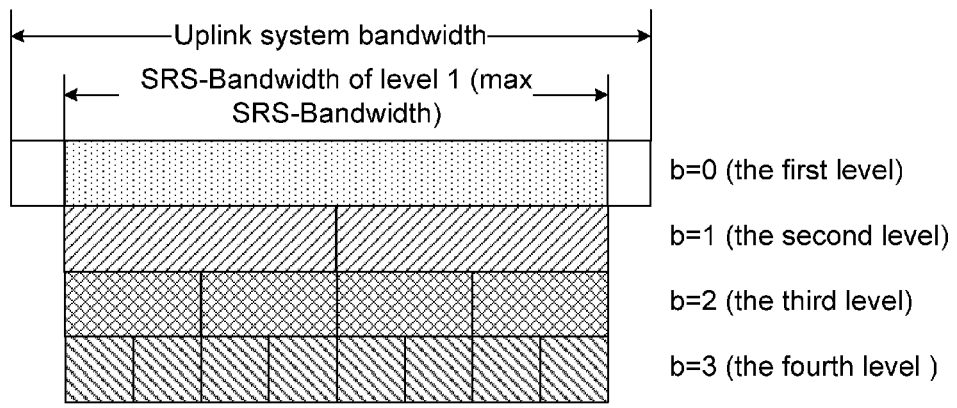
FIG. 3 is a schematic diagram of a tree structure of SRS-Bandwidth.
Figure 4:
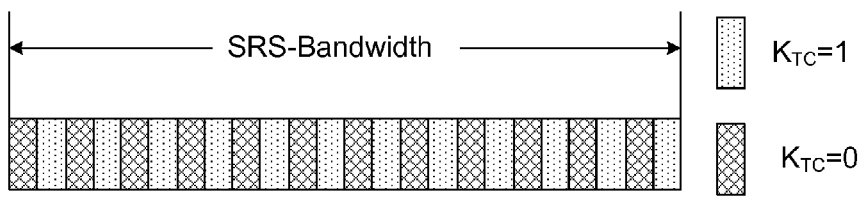
FIG. 4 is a schematic diagram of a comb structure of an SRS.

In the following description, the present invention is described in detail in combination with the drawings and embodiments of the present invention. The present invention takes an LTE system for example, but is not limited to the LTE system. It can also be used in other TDD systems.

The First Embodiment

When a terminal (it is called a user equipment (UE) in an LTE system) is to send an SRS, it needs to calculate the parameters of the resource for sending the SRS in a UpPTS according to configuration information related to the SRS, the parameters include a frequency domain starting position of the resource, and then the SRS is sent over the resource; wherein it is necessary to determine an index of the first sub-carrier in the maximum SRS-Bandwidth, when the frequency domain starting position of the resource is calculated.

The foregoing configuration information related to the SRS includes the configuration information related to the assigned resource (the assigned SRS-bandwidth is continuously distributed in the frequency domain) which is assigned by the base station for the SRS in the UpPTS and sent to the terminal by the base station when the base station needs to receive the SRS to perform the uplink channel sounding, such as the number of the level where the SRS-Bandwidth configured for the terminal is located in the corresponding tree structure. After the terminal receives the configuration information related to the SRS, the calculated parameters of the resource for sending the SRS include parameters related to the time domain, frequency domain and the sequence used. What the present invention cares is the frequency domain starting position (i.e. its index) of the first sub-carrier in the maximum SRS-Bandwidth among the frequency domain parameters, because the SRS-Bandwidth assigned by the base station on each level of the tree structure is within the frequency band range of the maximum SRS-Bandwidth, and the relative position of the SRS-Bandwidth on each level, which is located in the maximum SRS-Bandwidth can be determined according to the corresponding configuration parameters obtained by the terminal. Therefore, according to the index of the first sub-carrier in the maximum SRS-Bandwidth, the terminal can calculate the frequency domain starting position of the resource for sending the SRS. The specific algorithm can refer to the provisions in the standard.

In addition, it should be noted that among the parameters in the calculation formulae used in the present invention, some cell-specific parameters can be acquired from the cell broadcast, UE-specific parameters are configured through high layer signaling, and some other parameters are acquired through calculation according to other parameters. The acquisition of these parameters can refer to related standards.

In this embodiment, the terminal determines the index according to the frequency domain position of one PRACH or that of more PRACHs in the UpPTS, when the PRACH is mapped from the low frequency band to the high frequency band in the system bandwidth (in this case, one or more PRACHs in the UpPTS as a whole should contain the sub-carrier at the lower boundary of the system bandwidth), the upper boundary of the system bandwidth (the sub-carrier with the highest frequency band) is used as the end position of the maximum SRS-Bandwidth, thereby the starting position of the maximum SRS-Bandwidth can be calculated; when the PRACH is mapped from the high frequency band to the low frequency band in the system bandwidth (in this case, one or more PRACHs in the UpPTS as an whole should contain the sub-carrier at the upper boundary of the system bandwidth), the lower boundary of the system bandwidth (the sub-carriers with the lowest frequency band) is used as the starting position of the maximum SRS-Bandwidth, and then the index of the first sub-carrier in the maximum SRS-Bandwidth can be determined through the starting position of the maximum SRS-Bandwidth plus the offset parameter configured for the terminal.

The formula, with which the terminal calculates the index $k_0$ of the first sub-carrier (i.e. the sub-carrier with the minimum index) in the maximum SRS-Bandwidth, is as follows:

$$k_0 = \begin{cases} (N_{RB}^{UL} - m_{SRS}) \cdot N_{SC}^{RB} + k_{TC}, & \text{if } \left( \begin{array}{c} (n_f \bmod 2) \times \\ (2 - N_{SP}) + t_{RA}^1 \end{array} \right) \bmod 2 = 0 \\ k_{TC}, & \text{otherwise} \end{cases}$$

wherein $N_{RB}^{UL}$ is the number of RBs to which the uplink system bandwidth corresponds; $m_{SRS}$ is the number of RBs to which the maximum SRS-Bandwidth corresponds; $N_{SC}^{RB}$ is the number of sub-carriers in the frequency domain, which are contained in an RB; $k_{TC} \in \{0,1\}$ is an offset parameter configured for the terminal, i.e. the starting point of the comb structure; $n_f$ is the system frame number of the radio frame where the UpPTS is located; $N_{SP}$ is the number of the switch-points from downlink to uplink in a radio frame; when the UpPTS is in the first half-frame of the radio frame, $t_{RA}^1=0$, and when the UpPTS is in the second half-frame of the radio frame, $t_{RA}^1=1$.

Besides, "otherwise" in the formula denotes the circumstance of $((n_f \bmod 2) \times (2-N_{sp}) + t_{RA}^1) \bmod 2 \neq 0$.

The terminal can determine the foregoing maximum SRS-Bandwidth by the following methods:

in this embodiment, the terminal calculates the maximum SRS-Bandwidth $m_{SRS}$ with the following formula, when the SRS bandwidth configured for the terminal is on the first level of the tree structure of SRS bandwidth configuration:

$$m_{SRS} = m_{SRS,0}^{max} = \max_{\alpha_2,\alpha_3,\alpha_5} \left[ \begin{array}{l} m_{SRS,0} = 2^{1+\alpha_2} \cdot 3^{\alpha_3} \cdot 5^{\alpha_5} \mid \\ m_{SRS,0} \leq (N_{RB}^{UL} - 6 \cdot N_{RA}) \end{array} \right];$$

wherein $N_{RA}$ is the number of PRACHs in the UpPTS; $\alpha_2$, $\alpha_3$ and $\alpha_5$ are non-negative integers; $m_{SRS,0}$ is the SRS-Bandwidth of the first level, which is recalculated through selecting $\alpha_2$, $\alpha_3$ and $\alpha_5$; $m_{SRS}$ is the maximum SRS-Bandwidth, which is obtained through selecting $\alpha_2$, $\alpha_3$ and $\alpha_5$ under the condition that $m_{SRS,0} \leq (N_{RB}^{UL} - 6 \cdot N_{RA})$;

when the SRS-Bandwidth configured for the terminal is not on the first level of the tree structure of SRS bandwidth configuration, the SRS-Bandwidth $m_{SRS,0}$ of the first level of the tree structure is used as the maximum SRS-Bandwidth $m_{SRS}$, i.e. $m_{SRS} = m_{SRS,0}$. Or the maximum SRS-Bandwidth can also be calculated with the formula $m_{SRS} = N_{RB}^{UL} - 6 \cdot N_{RA}$.

In another embodiment, any one of the foregoing three methods for calculating the maximum SRS-Bandwidth can be selected.

The Second Embodiment

This embodiment is basically the same as the first embodiment. The difference between the two embodiments is in the method by which the index of the first sub-carrier in the maximum SRS-Bandwidth is calculated. In this embodiment, when the terminal determines the index according to the frequency domain position of one PRACH or that of more PRACHs in the UpPTS, first the maximum SRS-Bandwidth is located in the middle of the remaining frequency band which is obtained through subtracting from the uplink system bandwidth the frequency band occupied by the PRACH, thereby the starting position of the maximum SRS-Bandwidth is calculated, and then the index can be determined through the starting position of the maximum SRS-Bandwidth plus the offset parameter configured for the terminal.

The formula, with which the terminal calculates the index $k_0$ of the first sub-carrier in the maximum SRS-Bandwidth, is as follows:

$$k_0 = \begin{cases} \left( \dfrac{\left\lfloor \dfrac{N_{RB}^{UL}}{2} \right\rfloor - \dfrac{m_{SRS}}{2} + }{3N_{RA}} \right) \cdot N_{SC}^{RB} + k_{TC}, & \text{if } \left( \begin{array}{c} (n_f \bmod 2) \times \\ (2 - N_{SP}) + t_{RA}^1 \end{array} \right) \bmod 2 = 0 \\ \left( \dfrac{\left\lfloor \dfrac{N_{RB}^{UL}}{2} \right\rfloor - \dfrac{m_{SRS}}{2} - }{3N_{RA}} \right) \cdot N_{SC}^{RB} + k_{TC}, & \text{otherwise} \end{cases}$$

wherein $N_{RB}^{UL}$ is the number of RBs to which the uplink system bandwidth corresponds; $m_{SRS}$ is the number of RBs to which the maximum SRS-Bandwidth corresponds; $N_{RA}$ is the number of PRACHs in the UpPTS; $N_{SC}^{RB}$ is the number of sub-carriers in the frequency domain, which are contained in an RB; $k_{TC} \in \{0,1\}$ is an offset parameter configured for the terminal; $n_f$ is the system frame number of the radio frame where the UpPTS is located; $N_{SP}$ is the number of the switch-points from downlink to uplink in a radio frame; when the UpPTS is in the first half-frame of the radio frame, $t_{RA}^1 = 0$, and when the UpPTS is in the second half-frame of the radio frame, $t_{RA}^1 = 1$.

The terminal can determine the foregoing maximum SRS-Bandwidth by the same methods as that of the first embodiment.

The Third Embodiment

This embodiment is basically the same as the first embodiment. The difference between the two embodiments is in the method by which the index of the first sub-carrier in the maximum SRS-Bandwidth is calculated. In this embodiment, the terminal determines the index according to the frequency domain position of one PRACH or that of more PRACHs in the UpPTS, when the PRACH includes the sub-carrier at the lower boundary of the system bandwidth, the first sub-carrier following the PRACH is used as the starting position of the maximum SRS-Bandwidth; when the PRACH includes the sub-carriers at the upper boundary of the system bandwidth, the lower boundary of the system bandwidth is used as the starting position of the maximum SRS-Bandwidth, and then the index can be determined through the starting position of the maximum SRS-Bandwidth plus the offset parameter configured for the terminal.

The formula, with which the terminal calculates the index $k_0$ of the first sub-carrier in the maximum SRS-Bandwidth, is as follows:

$$k_0 = \begin{cases} 6N_{RA} \cdot N_{SC}^{RB} + k_{TC}, & \text{if } \left( \begin{array}{c} (n_f \bmod 2) \times \\ (2 - N_{SP}) + t_{RA}^1 \end{array} \right) \bmod 2 = 0 \\ k_{TC} & \text{otherwise} \end{cases}$$

wherein $N_{RA}$ is the number of PRACHs in the UpPTS; $N_{SC}^{RB}$ is the number of sub-carriers in the frequency domain, which are contained in an RB; $k_{TC} \in \{0,1\}$ is an offset parameter configured for the terminal; $n_f$ is the system frame number of the radio frame where the UpPTS is located; $N_{SP}$ is the number of the switch-points from downlink to uplink in a radio frame; when the UpPTS is in the first half-frame of the radio frame, $t_{RA}^1 = 0$, and when the UpPTS is in the second half-frame of the radio frame, $t_{RA}^1 = 1$.

The terminal can determine the foregoing maximum SRS-Bandwidth by the same methods as that of the first embodiment.

In the following, the methods of the present invention are described in combination with application examples.

APPLICATION EXAMPLE 1

Condition:

the number of RBs to which the uplink system bandwidth corresponds is $N_{RB}^{UL} = 25$;

the uplink/downlink time slot configuration adopted by the TDD system is Configuration 1, then the number of the switch-points from downlink to uplink in a radio frame is $N_{SP} = 2$;

the number of PRACHs in an UpPTS is $N_{RA} = 1$;

$$\text{the formula } m_{SRS,0}^{max} = \max_{\alpha_2,\alpha_3,\alpha_5} \left[ \begin{array}{l} m_{SRS,0} = 2^{1+\alpha_2} \cdot 3^{\alpha_3} \cdot 5^{\alpha_5} \mid \\ m_{SRS,0} \leq (N_{RB}^{UL} - 6 \cdot N_{RA}) \end{array} \right]$$

is used to calculate the maximum SRS-Bandwidth, then $m_{SRS} = 18 (\alpha_2 = 1, \alpha_3 = 2, \alpha_5 = 0)$ $k_{TC} = 0$.

Here the starting position of the maximum SRS-Bandwidth is calculated by the method of the first embodiment:

when the PRACH is mapped from the high frequency band to the low frequency band in the system bandwidth (i.e. when $((n_f \bmod 2) \times (2 - N_{SP}) + t_{RA}^1) \bmod 2 \neq 0$), the starting position of the maximum SRS-Bandwidth is at the lower boundary of the system frequency band. The index of the sub-carrier in the frequency domain starting position of the maximum SRS-Bandwidth is $k_0 = k_{TC} = 0$;

when the PRACH is mapped from the low frequency band to the high frequency band in the system bandwidth (i.e. when $((n_f \bmod 2) \times (2-N_{SP})+t_{RA}^1) \bmod 2=0)$, the end position of the maximum SRS-Bandwidth is at the upper boundary of the system bandwidth. The index of the sub-carrier in the frequency domain starting position of the maximum SRS-Bandwidth is $k_0=(N_{RB}^{UL}-m_{SRS}) \cdot N_{SC}^{RB}+k_{TC}=84$.

Figure 5A:
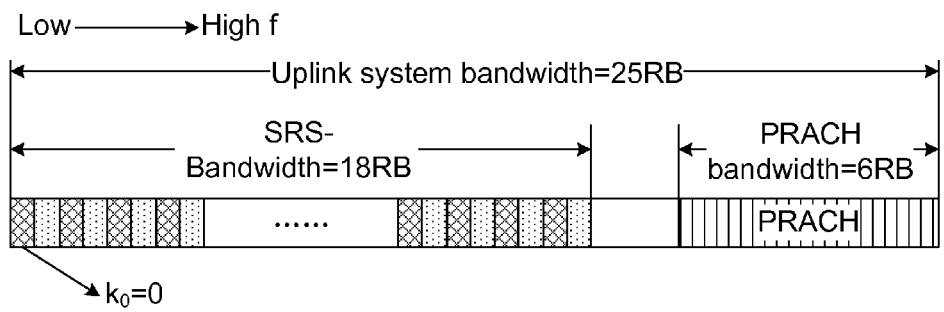
FIG. 5A and FIG. 5B are respectively a schematic diagram of the starting position of the maximum SRS-Bandwidth with the PRACH mapped from the high frequency band to the low frequency band in the system bandwidth, and that of the maximum SRS-Bandwidth with the PRACH mapped from the low frequency band to the high frequency band according to the application example 1 of the present invention.
Figure 5B:
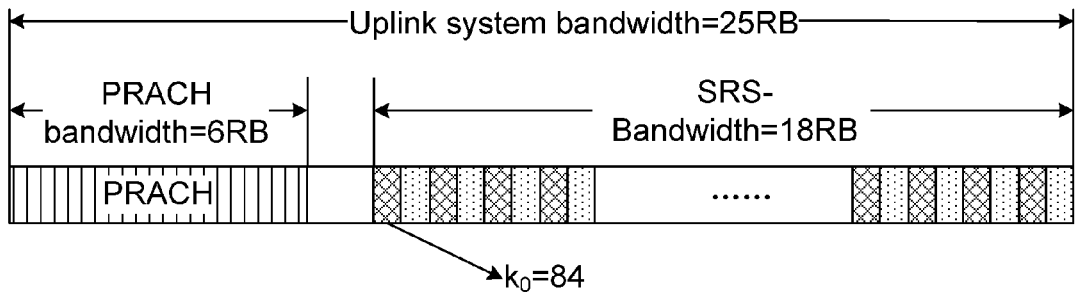

The positions of the maximum SRS-Bandwidth under the foregoing two circumstances are shown in FIG. 5A and FIG. 5B respectively.

APPLICATION EXAMPLE 2

Condition:
the number of RBs to which the uplink system bandwidth corresponds is $N_{RB}^{UL}=25$;
the uplink/downlink time slot configuration adopted by the TDD system is Configuration 1, then the number of the switch-points from downlink to uplink in a radio frame is $N_{SP}=2$;
the number of PRACHs in an UpPTS is $N_{RA}=1$;
SRS bandwidth configuration 4 is adopted, from Table 3, it is got that the maximum SRS-Bandwidth $m_{SRS}=m_{SRS,0}=16$; $k_{TC}=1$.

Here the starting position of the maximum SRS-Bandwidth is calculated by the method of the first embodiment:

when the PRACH is mapped from the high frequency band to the low frequency band in the system bandwidth (i.e. when $((n_f \bmod 2) \times (2-N_{SP})+t_{RA}^1) \bmod 2 \neq 0)$, the starting position of the maximum SRS-Bandwidth is at the lower boundary of the system frequency band. The index of the sub-carrier in the frequency domain starting position of the maximum SRS-Bandwidth is $k_0=k_{TC}=1$;

when the PRACH is mapped from the low frequency band to the high frequency band in the system bandwidth (i.e. when $((n_f \bmod 2) \times (2-N_{SP})+t_{RA}^1) \bmod 2=0)$, the end position of the maximum SRS-Bandwidth is at the upper boundary of the system bandwidth. The index of the sub-carrier in the frequency domain starting position of the maximum SRS-Bandwidth is $k_0=(N_{RB}^{UL}-m_{SRS}) \cdot N_{SC}^{RB}+k_{TC}=109$.

Figure 6A:
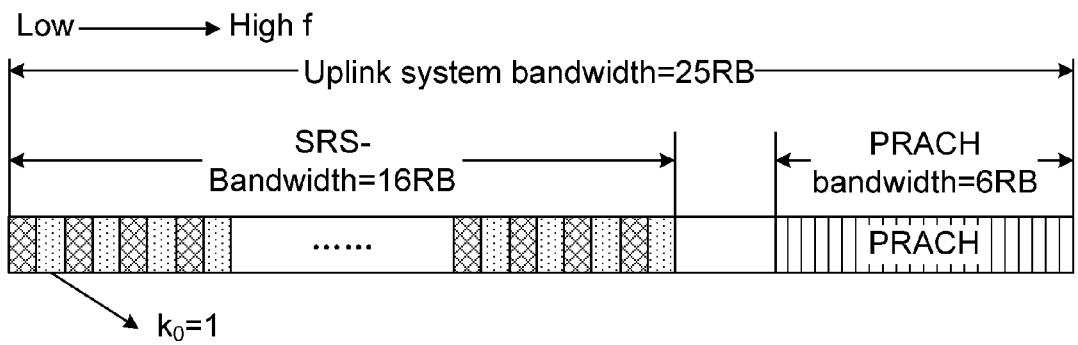
FIG. 6A and FIG. 6B are respectively a schematic diagram of the starting position of the maximum SRS-Bandwidth with the PRACH mapped from the high frequency band to the low frequency band in the system bandwidth, and that of the maximum SRS-Bandwidth with the PRACH mapped from the low frequency band to the high frequency band according to the application example 2 of the present invention.
Figure 6B:
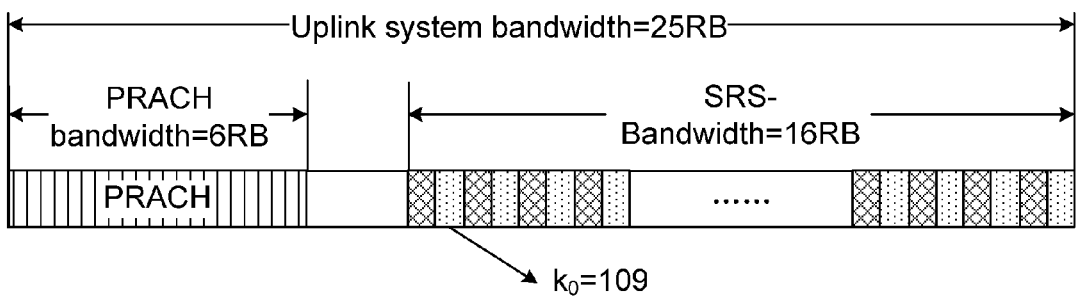

The positions of the maximum SRS-Bandwidth under the foregoing two circumstances are shown in FIG. 6A and FIG. 6B respectively.

APPLICATION EXAMPLE 3

Condition:
the number of RBs to which the uplink system bandwidth corresponds is $N_{RB}^{UL}=25$;
the uplink/downlink time slot configuration adopted by the TDD system is Configuration 1, then the number of the switch-points from downlink to uplink in a radio frame is $N_{SP}=2$;
the number of PRACHs in an UpPTS is $N_{RA}=1$;
SRS bandwidth configuration 4 is adopted, from Table 3, it is got that the maximum SRS-Bandwidth $m_{SRS}=m_{SRS,0}=16$; $k_{TC}=1$.

Here the starting position of the maximum SRS-Bandwidth is calculated by the method of the second embodiment: i.e. the maximum SRS-Bandwidth is located in the middle of the remaining frequency band which is obtained through subtracting from the uplink system bandwidth the frequency band occupied by the PRACH.

when the PRACH is mapped from the high frequency band to the low frequency band in the system bandwidth (i.e. when $((n_f \bmod 2) \times (2-N_{SP})+t_{RA}^1) \bmod 2 \neq 0)$, the index of the sub-carrier in the frequency domain starting position of the maximum SRS-Bandwidth is $$k_0 = \left(\left\lfloor \frac{N_{RB}^{UL}}{2} \right\rfloor - \frac{m_{SRS}}{2} - 3N_{RA}\right) \cdot N_{SC}^{RB} + k_{TC} = 13;$$

when the PRACH is mapped from the low frequency band to the high frequency band in the system bandwidth (i.e. when $((n_f \bmod 2) \times (2-N_{SP})+t_{RA}^1) \bmod 2=0)$, the index of the sub-carrier in the frequency domain starting position of the maximum SRS-Bandwidth is $$k_0 = \left(\left\lfloor \frac{N_{RB}^{UL}}{2} \right\rfloor - \frac{m_{SRS}}{2} + 3N_{RA}\right) \cdot N_{SC}^{RB} + k_{TC} = 85.$$

Figure 7A:
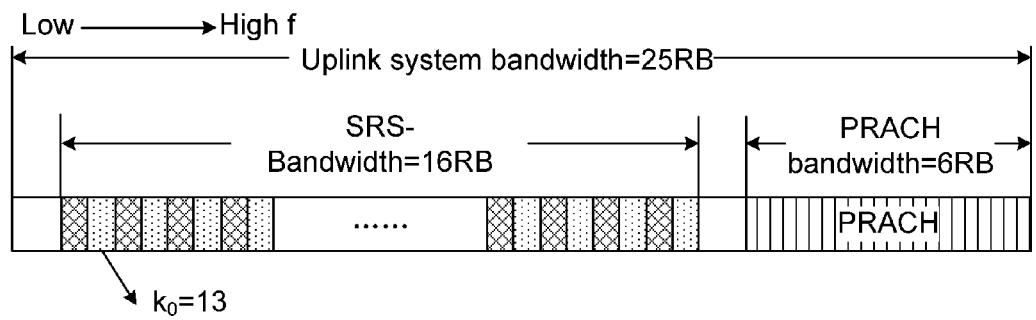
FIG. 7A and FIG. 7B are respectively a schematic diagram of the starting position of the maximum SRS-Bandwidth with the PRACH mapped from the high frequency band to the low frequency band in the system bandwidth, and that of the maximum SRS-Bandwidth with the PRACH mapped from the low frequency band to the high frequency band according to the application example 3 of the present invention.
Figure 7B:
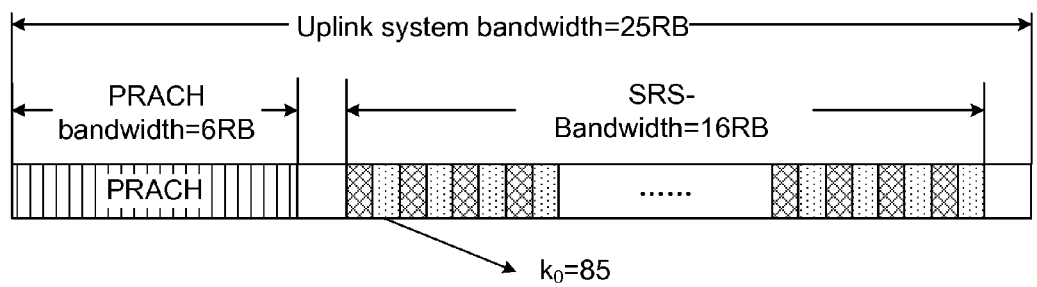

The positions of the maximum SRS-Bandwidth under the foregoing two circumstances are shown in FIG. 7A and FIG. 7B respectively.

APPLICATION EXAMPLE 4

Condition:
the number of RBs to which the uplink system bandwidth corresponds is $N_{RB}^{UL}=25$;
the uplink/downlink time slot configuration adopted by the TDD system is Configuration 1, then the number of the switch-points from downlink to uplink in a radio frame is $N_{SP}=2$.
the number of PRACHs in an UpPTS is $N_{RA}=1$;
SRS bandwidth configuration 4 is adopted, from Table 3, it is got that maximum SRS-Bandwidth is $m_{SRS}=m_{SRS,0}=16$. $k_{TC}=1$.

Here the starting position of the maximum SRS-Bandwidth is calculated by the method of the third embodiment.

when the PRACH is mapped from the high frequency band to the low frequency band in the system bandwidth (i.e. when $((n_f \bmod 2) \times (2-N_{SP})+t_{RA}^1) \bmod 2 \neq 0)$, the starting position of the maximum SRS-Bandwidth is at the lower boundary of the system frequency band, the index of the sub-carrier in the frequency domain starting position of the maximum SRS-Bandwidth is $k_0=k_{TC}=1$;

when the PRACH is mapped from the low frequency band to the high frequency band in the system bandwidth (i.e. when $((n_f \bmod 2) \times (2-N_{SP})+t_{RA}^1) \bmod 2=0)$, the maximum SRS-Bandwidth is located following the frequency band occupied by the PRACH, i.e. the starting position of the maximum SRS-Bandwidth is adjacent to the upper boundary of the bandwidth occupied by the PRACH, the index of the sub-carrier in the frequency domain starting position of the maximum SRS-Bandwidth is $k_0=6N_{RA} \cdot N_{SC}^{RB}+k_{TC}=73$.

Figure 8A:
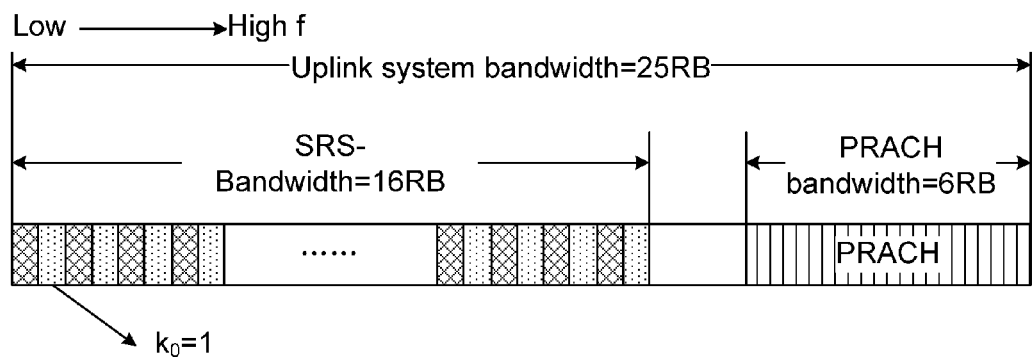
FIG. 8A and FIG. 8B are respectively a schematic diagram of the starting position of the maximum SRS-Bandwidth with the PRACH mapped from the high frequency band to the low frequency band in the system bandwidth, and that of the maximum SRS-Bandwidth with the PRACH mapped from the low frequency band to the high frequency band according to the application example 4 of the present invention.
Figure 8B:
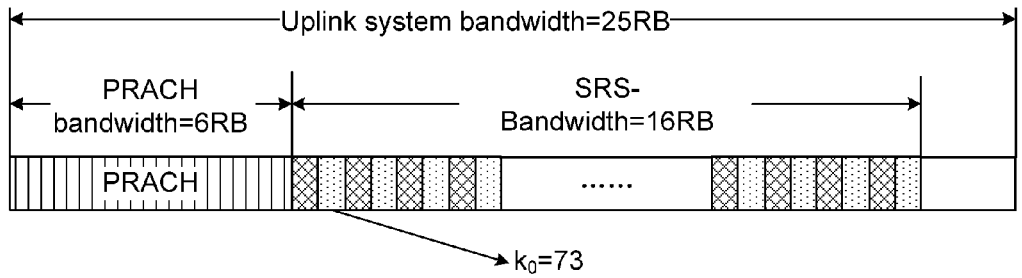

The positions of the maximum SRS-Bandwidth under the foregoing two circumstances are shown in FIG. 8A and FIG. 8B respectively.

APPLICATION EXAMPLE 5

Condition:
the number of RBs to which the uplink system bandwidth corresponds is $N_{RB}^{UL}=25$;
the uplink/downlink time slot configuration adopted by the TDD system is Configuration 1, then the number of the switch-points from downlink to uplink in a radio frame is $N_{SP}=2$.

the number of PRACHs in an UpPTS is $N_{RA}=1$;

the formula $m_{SRS}=N_{RB}{}^{UL}-6 \cdot N_{RA}$ is adopted to calculate the maximum SRS bandwidth $m_{SRS}=19$.

$k_{TC}=1$.

Here the starting position of the maximum SRS-Bandwidth is calculated by the method of the first embodiment:

when the PRACH is mapped from the high frequency band to the low frequency band in the system bandwidth (i.e. when $((n_f \bmod 2) \times (2-N_{SP})+t_{RA}{}^1) \bmod 2 \neq 0$), the starting position of the maximum SRS-Bandwidth is at the lower boundary of the system frequency band, the index of the sub-carrier in the frequency domain starting position of the maximum SRS-Bandwidth is $k_0=k_{TC}=1$;

when the PRACH is mapped from the low frequency band to the high frequency band in the system bandwidth (i.e. when $((n_f \bmod 2) \times (2-N_{SP})+t_{RA}{}^1) \bmod 2=0$), the end position of the maximum SRS-Bandwidth is at the upper boundary of the system bandwidth, the index of the sub-carrier in the frequency domain starting position of the maximum SRS-Bandwidth is $k_0=(N_{RB}{}^{UL}-m_{SRS}) \cdot N_{SC}{}^{RB}+k_{TC}=73$.

Figure 9A:
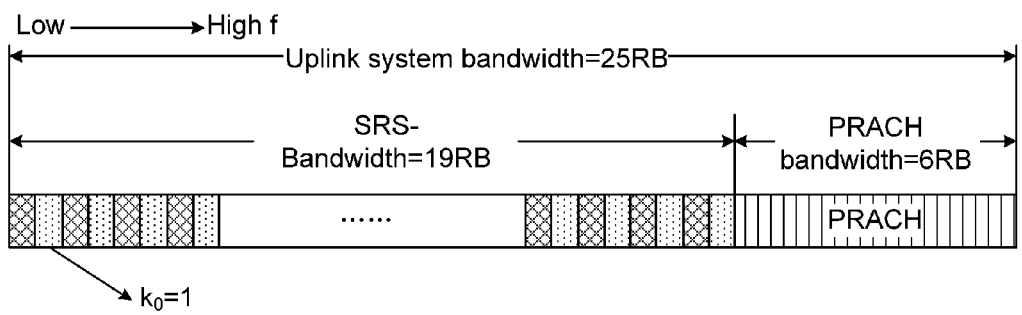
FIG. 9A and FIG. 9B are respectively a schematic diagram of the starting position of the maximum SRS-Bandwidth with the PRACH mapped from the high frequency band to the low frequency band in the system bandwidth, and that of the maximum SRS-Bandwidth with the PRACH mapped from the low frequency band to the high frequency band according to the application example 5 of the present invention.
Figure 9B:
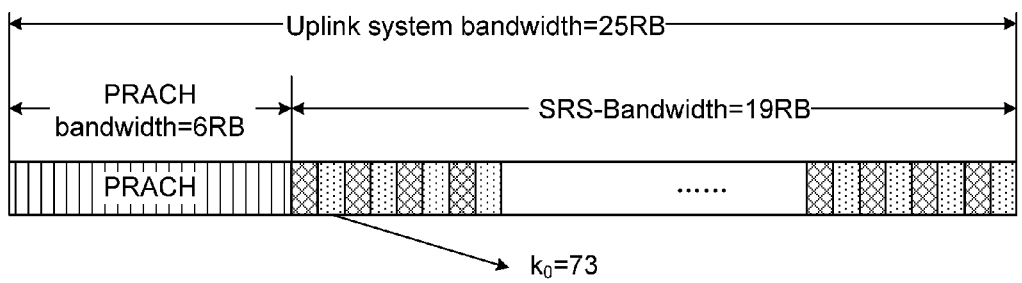

The positions of the maximum SRS-Bandwidth under the foregoing two circumstances are shown in FIG. 9A and FIG. 9B respectively.

The foregoing descriptions are only preferred embodiments of the present invention and are not intended to limit the present invention. For those skilled in the art, the present invention may have various changes and modifications. All modifications, equivalent substitutions and improvements etc, made without departing from the spirit and principle of the present invention shall be within the protection scope of the present invention.

Industrial Applicability

The present invention provides a method for sending an SRS of uplink channel in a TDD system. With sending position of the maximum SRS-Bandwidth in the UpPTS, which is obtained by the method of the present invention, the interference between the SRS signal and the PARCH can be avoided, and it is possible to implement the channel sounding for more bandwidth.

What is claimed is:

1. A method for sending an SRS of uplink channel in a TDD system, a terminal calculating parameters of resources for sending an SRS in a UpPTS according to configuration information related to the SRS of the uplink channel, the parameters including a frequency domain starting position of the resource, and then the SRS being sent over the resource; wherein it being necessary to determine an index of a first sub-carrier in a maximum SRS-Bandwidth when the frequency domain starting position of the resource is calculated;

the terminal determining the index according to the frequency domain position of one PRACH or that of more PRACHs in the UpPTS, when the PRACH includes a sub-carrier at a lower boundary of a system bandwidth, the upper boundary of the system bandwidth being used as the end position of the maximum SRS-Bandwidth, thereby the starting position of the maximum SRS-Bandwidth being calculated; and when the PRACH includes a sub-carrier at an upper boundary of the system bandwidth, the lower boundary of the system bandwidth being used as the starting position of the maximum SRS-Bandwidth, and then the index being determined through the starting position of the maximum SRS-Bandwidth plus an offset parameter configured for the terminal.

2. A method for sending an SRS of uplink channel in a TDD system, a terminal calculating parameters of resources for sending an SRS in a UpPTS according to configuration information related to the SRS of the uplink channel, the parameters including a frequency domain starting position of the resource, and then the SRS being sent over the resource; wherein it being necessary to determine an index $k_0$ of a first sub-carrier in a maximum SRS-Bandwidth $m_{SRS}$ when the starting position of the resource is calculated;

the terminal calculating the index $k_0$ with the following formula:

$$k_0 = \begin{cases} (N_{RB}^{UL} - m_{SRS}) \cdot N_{SC}^{RB} + k_{TC}, & \text{if } \left( \begin{array}{c} (n_f \bmod 2) \times \\ (2-N_{SP}) + t_{RA}^1 \end{array} \right) \bmod 2 = 0 \\ k_{TC}, & \text{if } \left( \begin{array}{c} (n_f \bmod 2) \times \\ (2-N_{SP}) + t_{RA}^1 \end{array} \right) \bmod 2 \neq 0 \end{cases}$$

wherein $N_{RB}{}^{UL}$ being the number of RBs to which the uplink system bandwidth corresponds; $m_{mSRS}$ being the number of RBs to which the maximum SRS-Bandwidth corresponds; $N_{SC}{}^{RB}$ being the number of sub-carriers in the frequency domain, which are contained in an RB; $k_{TC} \in \{0,1\}$ being an offset parameter configured for the terminal; $n_f$ being the system frame number of a radio frame where the UpPTS is located; $N_{SP}$ being the number of switch-points from downlink to uplink in a radio frame; when the UpPTS is in the first half-frame of the radio frame, $t_{RA}{}^1=0$, and when the UpPTS is in the second half-frame of the radio frame, $t_{RA}{}^1=1$.

3. The method according to claim 2, wherein the terminal calculates the maximum SRS-Bandwidth $m_{SRS}$ by one of the following three methods:

the first method: the terminal calculates the maximum SRS-Bandwidth $m_{SRS}$ with the following formula:

$$m_{SRS} = m_{SRS,0}^{max} = \max_{\alpha_2, \alpha_3, \alpha_5} \left[ \begin{array}{l} m_{SRS,0} = 2^{1+\alpha_2} \cdot 3^{\alpha_3} \cdot 5^{\alpha_5} \mid \\ m_{SRS,0} \leq (N_{RB}^{UL} - 6 \cdot N_{RA}) \end{array} \right] \quad (1)$$

wherein $N_{RA}$ is the number of PRACHs in the UpPTS; $\alpha_2$, $\alpha_3$ and $\alpha_5$ are non-negative integers; $m_{SRS,0}$ is the SRS-Bandwidth of a first level, which is recalculated through selecting $\alpha_2$, $\alpha_3$ and $\alpha_5$; $m_{SRS}$ is the maximum SRS-Bandwidth, which is obtained through selecting $\alpha_2$, $\alpha_3$ and $\alpha_5$ under the condition that $m_{SRS,0} \leq (N_{RB}{}^{UL} - 6 \cdot N_{RA})$; and is the number of PRACHs in the UpPTS;

the second method: the terminal calculates the maximum SRS-Bandwidth $m_{SRS}$ with the formula $m_{SRS}=N_{RB}{}^{UL}-6 \cdot N_{RA}$, wherein $N_{RA}$ is the number of PRACHs in the UpPTS;

the third method: the terminal uses the SRS-Bandwidth $m_{SRS,0}$ of a first level in the tree structure to which SRS bandwidth configuration corresponds as the maximum SRS-Bandwidth $m_{SRS}$.

4. The method according to claim 3, wherein the terminal calculates the maximum SRS-Bandwidth $m_{SRS}$ by the first method or the second method, when the SRS-Bandwidth configured for the terminal is on the first level of the tree structure of SRS bandwidth configuration; and calculates the maximum SRS-Bandwidth $m_{SRS}$ by the third method, when the SRS-Bandwidth configured for the terminal is not on the first level of the tree structure of SRS bandwidth configuration.

5. A method for sending an SRS of uplink channel in a TDD system, a terminal calculating parameters of resources for sending an SRS in a UpPTS according to configuration information related to the SRS of the uplink channel, the parameters including a frequency domain starting position of the resource, and then the SRS being sent over the resource; wherein it being necessary to determine an index of a first sub-carrier in a maximum SRS-Bandwidth when the frequency domain starting position of the resource is calculated;

the terminal determining the index according to the frequency domain position of one PRACH or that of more PRACHs in the UpPTS, first the maximum SRS-Bandwidth being located in the middle of remaining frequency band which is obtained through subtracting from the uplink system bandwidth the frequency band occupied by the PRACH, thereby the starting position of the maximum SRS-Bandwidth being calculated, and then the index being determined through the starting position of the maximum SRS-Bandwidth plus an offset parameter configured for the terminal.

6. A method for sending an SRS of uplink channel in a TDD system, a terminal calculating parameters of resources parameters of resources for sending an SRS in a UpPTS according to configuration information related to the SRS of the uplink channel, the parameters including a frequency domain starting position of the resource, and then the SRS being sent over the resource; wherein it being necessary to determine an index $k_0$ of a first sub-carrier in a maximum SRS-Bandwidth $m_{SRS}$ when the frequency domain starting position of the resource is calculated;

the terminal calculating the index $k_0$ with the following formula:

$$k_0 = \begin{cases} \left(\dfrac{\left\lfloor\dfrac{N_{RB}^{UL}}{2}\right\rfloor - \dfrac{m_{SRS}}{2} +}{3N_{RA}}\right) \cdot N_{SC}^{RB} + k_{TC}, & \text{if } \left(\dfrac{(n_f \bmod 2) \times}{(2 - N_{SP}) + t_{RA}^1}\right) \bmod 2 = 0 \\ \left(\dfrac{\left\lfloor\dfrac{N_{RB}^{UL}}{2}\right\rfloor - \dfrac{m_{SRS}}{2} -}{3N_{RA}}\right) \cdot N_{SC}^{RB} + k_{TC}, & \text{if } \left(\dfrac{(n_f \bmod 2) \times}{(2 - N_{SP}) + t_{RA}^1}\right) \bmod 2 \neq 0 \end{cases}$$

wherein $N_{RB}^{UL}$ being the number of RBs to which the uplink system bandwidth corresponds; $m_{SRS}$ being the number of RBs to which the maximum SRS-Bandwidth corresponds; $N_{RA}$ being the number of PRACHs in the UpPTS; $N_{SC}^{RB}$ being the number of sub-carriers in the frequency domain, which are contained in an RB; $k_{TC} \in \{0,1\}$ being an offset parameter configured for the terminal; $n_f$ being the system frame number of a radio frame where the UpPTS is located; $N_{SP}$ being the number of switch-points from downlink to uplink in a radio frame; when the UpPTS is in the first half-frame of the radio frame, $t_{RA}^1 = 0$, and when the UpPTS is in the second half-frame of the radio frame, $t_{RA}^1 = 1$.

7. The method according to claim 6, wherein the terminal calculates the maximum SRS-Bandwidth $m_{SRS}$ by one of the following three methods:

the first method: the terminal calculates the maximum SRS-Bandwidth $m_{SRS}$ with the following formula:

$$m_{SRS} = m_{SRS,0}^{max} = \max_{\alpha_2, \alpha_3, \alpha_5} \left[ \begin{array}{l} m_{SRS,0} = 2^{1+\alpha_2} \cdot 3^{\alpha_3} \cdot 5^{\alpha_5} \mid \\ m_{SRS,0} \leq (N_{RB}^{UL} - 6 \cdot N_{RA}) \end{array} \right] \quad (1)$$

wherein $N_{RA}$ is the number of PRACHs in the UpPTS; $\alpha_2$, $\alpha_3$ and $\alpha_5$ are non-negative integers; $m_{SRS,0}$ is the SRS-Bandwidth of a first level, which is recalculated through selecting $\alpha_2$, $\alpha_3$ and $\alpha_5$; $m_{SRS}$ is the maximum SRS-Bandwidth, which is obtained through selecting $\alpha_2$, $\alpha_3$ and $\alpha_5$ under the condition that $m_{SRS,0} \leq (N_{RA} - 6 \cdot N_{RA})$; and $N_{RA}$ is the number of PRACHs in the UpPTS;

the second method: the terminal calculates the maximum SRS-Bandwidth $m_{SRS}$ with the formula $m_{SRS} = N_{RB}^{UL} - 6 \cdot N_{RA}$, wherein $N_{RA}$ is the number of PRACHs in the UpPTS;

the third method: the terminal uses the SRS-Bandwidth $m_{SRS,0}$ of a first level in the tree structure to which SRS-Bandwidth configuration corresponds as the maximum SRS-Bandwidth $m_{SRS}$.

8. The method according to claim 7, wherein the terminal calculates the maximum SRS-Bandwidth $m_{SRS}$ by the first method or the second method, when the SRS-Bandwidth configured for the terminal is on the first level of the tree structure of SRS bandwidth configuration; and calculates the maximum SRS-Bandwidth $m_{SRS}$ by the third method, when the SRS-Bandwidth configured for the terminal is not on the first level of the tree structure of SRS bandwidth configuration.

9. A method for sending an SRS of uplink channel in a TDD system, a terminal calculating parameters of resources for sending an SRS in a UpPTS according to the configuration information related to the SRS of the uplink channel, the parameters including a frequency domain starting position of the resource, and then the SRS being sent over the resource; wherein it being necessary to determine an index of a first sub-carrier in a maximum SRS-Bandwidth when the frequency domain starting position of the resource is calculated;

the terminal determining the index according to the frequency domain position of one PRACH or that of more PRACHs in the UpPTS, when the PRACH includes a sub-carrier at a lower boundary of a system bandwidth, the first sub-carrier following the PRACH being used as the starting position of the maximum SRS-Bandwidth; and when the PRACH includes sub-carriers at a upper boundary of the system bandwidth, the lower boundary of the system bandwidth being used as the starting position of the maximum SRS-Bandwidth, and then the index can be determined through the starting position of the maximum SRS-Bandwidth plus an offset parameter configured for the terminal.

10. A method for sending an SRS of uplink channel in a TDD system, a terminal calculating parameters of resources for sending an SRS in a UpPTS according to configuration information related to the SRS of the uplink channel, the parameters including a frequency domain starting position of the resource, and then the SRS being sent over the resource; wherein it being necessary to determine an index $k_0$ of a first sub-carrier in a maximum SRS-Bandwidth $m_{SRS}$ when the frequency domain starting position of the resource is calculated;

the terminal calculates the index $k_0$ with the following formula:

$$k_0 = \begin{cases} 6N_{RA} \cdot N_{SC}^{RB} + k_{TC}, & \text{if } \left(\dfrac{(n_f \bmod 2) \times}{(2 - N_{SP}) + t_{RA}^1}\right) \bmod 2 = 0 \\ k_{TC} & \text{if } \left(\dfrac{(n_f \bmod 2) \times}{(2 - N_{SP}) + t_{RA}^1}\right) \bmod 2 \neq 0 \end{cases}$$

wherein $N_{RA}$ being the number of PRACHs in the UpPTS; $N_{SC}^{RB}$ being the number of sub-carriers in the frequency domain, which are contained in an RB; $k_{TC} \in \{0,1\}$ being an offset parameter configured for the terminal; $n_f$ being the system frame number of a radio frame where the UpPTS is located; $N_{SP}$ being the number of switch-points from downlink to uplink in a radio frame; when the UpPTS is in the first half-frame of the radio frame, $t_{RA}^1=0$, and when the UpPTS is in the second half-frame of the radio frame, $t_{RA}^1=1$.

11. The method according to claim 10, wherein the terminal calculates the maximum SRS-Bandwidth $m_{SRS}$ by one of the following three methods:

the first method: the terminal calculates the maximum SRS-Bandwidth $m_{SRS}$ with the following formula:

$$m_{SRS} = m_{SRS,0}^{max} = \max_{\alpha_2,\alpha_3,\alpha_5} \left[ \begin{array}{l} m_{SRS,0} = 2^{1+\alpha_2} \cdot 3^{\alpha_3} \cdot 5^{\alpha_5} \mid \\ m_{SRS,0} \leq (N_{RB}^{UL} - 6 \cdot N_{RA}) \end{array} \right] \quad (1)$$

wherein $N_{RA}$ is the number of PRACHs in the UpPTS; $\alpha_2$, $\alpha_3$ and $\alpha_5$ are non-negative integers; $m_{SRS,0}$ is the SRS-Bandwidth of a first level, which is recalculated through selecting $\alpha_2$, $\alpha_3$ and $\alpha_5$; $m_{SRS}$ is the maximum SRS-Bandwidth, which is obtained through selecting $\alpha_2$, $\alpha_3$ and $\alpha_5$ under the condition that $m_{SRS,0} \leq (N_{RB}^{UL} - 6 \cdot N_{RA})$; and $N_{RA}$ is the number of PRACHs in the UpPTS;

the second method: the terminal calculates the maximum SRS-Bandwidth $m_{SRS}$ with the formula $m_{SRS} = N_{RB}^{UL} - 6 \cdot N_{RA}$, wherein $N_{RA}$ is the number of PRACHs in the UpPTS;

the third method: the terminal uses the SRS-Bandwidth $m_{SRS,0}$ of a first level in the tree structure to which SRS bandwidth configuration corresponds as the maximum SRS-Bandwidth $m_{SRS}$.

12. The method according to claim 11, wherein the terminal calculates the maximum SRS-Bandwidth $m_{SRS}$ by the first method or the second method, when the SRS-Bandwidth configured for the terminal is on the first level of the tree structure of SRS bandwidth configuration; and calculates the maximum SRS-Bandwidth $m_{SRS}$ by the third method, when the SRS-Bandwidth configured for the terminal is not on the first level of the tree structure of SRS bandwidth configuration.

* * * * *